United States Patent
Kim et al.

(10) Patent No.: US 6,920,098 B2
(45) Date of Patent: Jul. 19, 2005

(54) OPTICAL PICK-UP DEVICE HAVING LENS FOR FIRST-ORDER LIGHT BEAM CONVERGENCE

(75) Inventors: Young Sik Kim, Kyoungki-do (KR); Chul Min Kim, Seoul (KR)

(73) Assignee: LG Electronics, Inc., Seoul (KR)

( * ) Notice: Subject to any disclaimer, the term of this patent is extended or adjusted under 35 U.S.C. 154(b) by 462 days.

(21) Appl. No.: 10/003,070

(22) Filed: Dec. 6, 2001

(65) Prior Publication Data

US 2002/0105881 A1 Aug. 8, 2002

(30) Foreign Application Priority Data

Dec. 29, 2000 (KR) .......................... 2000-85003

(51) Int. Cl.[7] .......................... G11B 7/125; G11B 7/135
(52) U.S. Cl. ............................. 369/53.26; 369/112.1; 369/112.25
(58) Field of Search .................... 369/53.26, 112.1, 369/112; 250/205, 201.5; 359/719, 563, 536

(56) References Cited

U.S. PATENT DOCUMENTS

| | | | | |
|---|---|---|---|---|
| 5,475,210 A | * | 12/1995 | Taguchi et al. ............. | 250/205 |
| 5,640,380 A | * | 6/1997 | Saimi et al. ............ | 369/112.18 |
| 6,346,695 B2 | * | 2/2002 | Yanagawa et al. .......... | 250/205 |
| 6,584,060 B1 | * | 6/2003 | Oohchida et al. ....... | 369/112.05 |

* cited by examiner

Primary Examiner—Aristotelis M Psitos
(74) Attorney, Agent, or Firm—Birch, Stewart, Kolasch & Birch, LLP

(57) ABSTRACT

Disclosed is a lens for light collection for total reflection for a front monitor photodiode (PD) in an optical pick-up device. The optical pick-up device includes a light source provided with a holographic unit adapted to diffract a light beam, an optical disc arranged in front of the light source and adapted to allow data to be written thereof or to be read therefrom, a monitor photodiode arranged in front of the light source in a diagonal direction with respect to the light source, the monitor photodiode serving to monitor a laser power of the light source, and a lens for light collection arranged between the light source and the monitor photodiode and adapted to converge a first-order diffracted beam outputted from the holographic unit and to apply the converged first-order diffracted beam to the monitor photodiode. The optical pick-up device can achieve an enhancement in the efficiency of utilizing a main beam, namely, a zero-order diffracted beam, an improvement in optical characteristics, and an improvement in the axial distance between the light source and the monitor PD.

7 Claims, 2 Drawing Sheets

OPTICAL PICK-UP DEVICE HAVING LENS FOR FIRST-ORDER LIGHT BEAM CONVERGENCE

BACKGROUND OF THE INVENTION

1. Field of the Invention

The present invention relates to a lens for light collection for total reflection for a front monitor photodiode (PD) in an optical pick-up device using a holographic unit.

2. Description of the Related Art

Recently, optical disc techniques have been highly developed. Also, demand for an inexpensive CD-R/RW(Compact Disc-Recordable/Re-Writable), which is an optical disc recording device, has greatly increased.

Although it is essential to provide a stable laser power in optical disc recording, there may be a fluctuation in laser power due to optical feedback of a light beam from an optical disc.

In order to solve this problem, a drive current adjusting method may be used, in which laser power is monitored to ensure that the laser power is constant. For this laser power monitoring, a monitor photodiode (PD) may be used.

Typically, a monitor PD is arranged in rear of a laser diode in order to conveniently monitor the laser power of the laser diode. However, such a rear monitor PD has a drawback in that it exhibits a degraded accuracy because it utilizes a rearwardly-emitted optical output from a laser diode which is more non-linear than a forwardly-emitted optical output from the laser diode.

In order to solve this problem, a front monitor PD may be used which directly monitors a forwardly-emitted optical light beam.

FIG. 1 illustrates the configuration of a general optical system used for a front monitor PD in a CD-R/RW using a high-power holographic pick-up module as an optical pick-up.

A light beam outputted from a holographic pick-up module (HPM) 101 is converted into a collimated beam while passing through a collimator lens 102. The collimated beam is transmitted through a beam splitter 103, and then reflected by a mirror 104. The reflected light beam is converged by an objective lens 105, so that it is focused onto an optical disc 106. A zero-order one of the light beam outputted from the HPM 101 is partially incident to a monitor PD 107 by the beam splitter 103 so that it is utilized in the adjustment of recording optical power.

However, the above mentioned conventional optical system used in the front monitor PD has a drawback in that it exhibits a degraded light using efficiency because it utilizes a part of the zero-order beam outputted from the HPM.

Furthermore, this optical system degrades the optical characteristics of the monitor PD. In addition, there is a drawback in that the axial distance of the monitor PD from a light source is too great.

SUMMARY OF THE INVENTION

The present invention proposes a lens for light collection for total reflection for a front monitor PD.

Accordingly, an object of the invention is to provide a lens for light collection for total reflection for a front monitor PD which is configured to make a first-order diffracted light beam, generated in accordance with a light diffraction by a holographic optical element (HOE), incident to the monitor PD in a focused state, thereby being capable of achieving an enhancement in light using efficiency, an improvement in optical characteristics and a reduction in the axial distance of the monitor PD from a light source.

Another object of the invention is to provide a lens for light collection having a structure provided with a spherical face (lens face) adapted to focus a first-order diffracted light beam emerging from an HOE, a total reflective face adapted to make the focused first-order diffracted beam incident to a monitor PD, and an exit face.

Another object of the invention is to provide a lens for light collection for total reflection for a front monitor PD which is provided with an optical waveguide adapted to transmit a first-order diffracted light beam, emerging from an HOE, to the monitor PD, the optical waveguide being integral with the lens for light collection.

In accordance with an embodiment of the present invention, there is provided an optical pick-up device comprising: a light source provided with a holographic unit adapted to diffract a light beam; an optical disc adapted to allow data to be written thereof or to be read therefrom; a monitor photodiode served to monitor a laser power of the light source; and a lens for light collection arranged between the light source and the monitor photodiode and adapted to converge a first-order diffracted beam outputted from the holographic unit and to apply the converged first-order diffracted beam to the monitor photodiode.

In this embodiment, the lens for light collection may comprise a lens face for converging the first-order diffracted light beam, a total reflective face for totally reflecting the converged first-order diffracted beam, and an exit face for transmitting the reflected first-order diffracted beam to the monitor photodiode. The lens face may have a spherical shape convex toward the light source. Facing edges of the reflective face and the exit face may be in contact with each other.

Alternatively, the lens for light collection may comprise a lens face for converging the first-order diffracted light beam, a first reflective face for totally reflecting the converged first-order diffracted beam passing through the lens face, a second reflective face for totally reflecting again the reflected first-order diffracted beam, and an exit face for transmitting the first-order diffracted beam, repeatedly reflected, to the monitor photodiode. In this case, the first and second reflective faces may be parallel with each other so that the first-order diffracted beam is repeatedly totally reflected. Also, the lens for light collection may further comprise an optical waveguide arranged between the first and second reflective faces to guide the first-order diffracted beam to the monitor photodiode. The exit face may have an inclined shape with respect to the first-order diffracted beam traveling along the optical waveguide.

In accordance with another embodiment, the objective lens comprises a lens face for converging a first-order diffracted light beam outputted from the holographic unit, a total reflective face for totally reflecting the first-order diffracted beam passing through the lens face, and an exit face for transmitting the reflected first-order diffracted beam to the monitor photodiode.

In accordance with another embodiment, the objective lens comprises a lens face for converging a first-order diffracted light beam outputted from the holographic unit, a first reflective face for totally reflecting the converged first-order diffracted beam passing through the lens face, a second reflective face for totally reflecting again the reflected first-order diffracted beam, and an exit face for transmitting the first-order diffracted beam, repeatedly reflected, to the monitor photodiode.

BRIEF DESCRIPTION OF THE DRAWINGS

The above objects, and other features and advantages of the present invention will become more apparent after a reading of the following detailed description when taken in conjunction with the drawings, in which.

DESCRIPTION OF THE PREFERRED EMBODIMENTS

Now, preferred embodiments of the present invention will be described in detail with reference to the annexed drawings.

Figure 1:
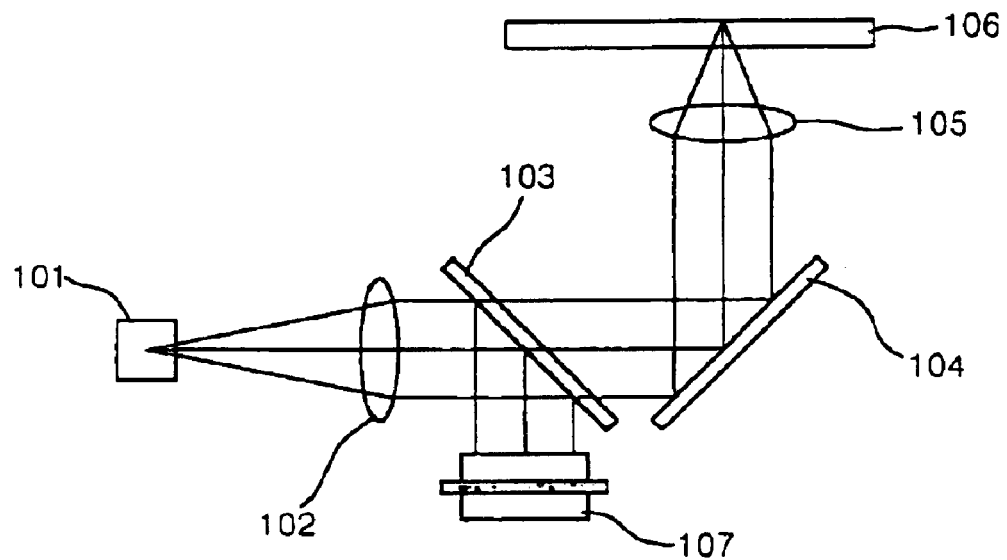
FIG. 1 is a schematic view illustrating the configuration of a conventional optical system.
Figure 2:
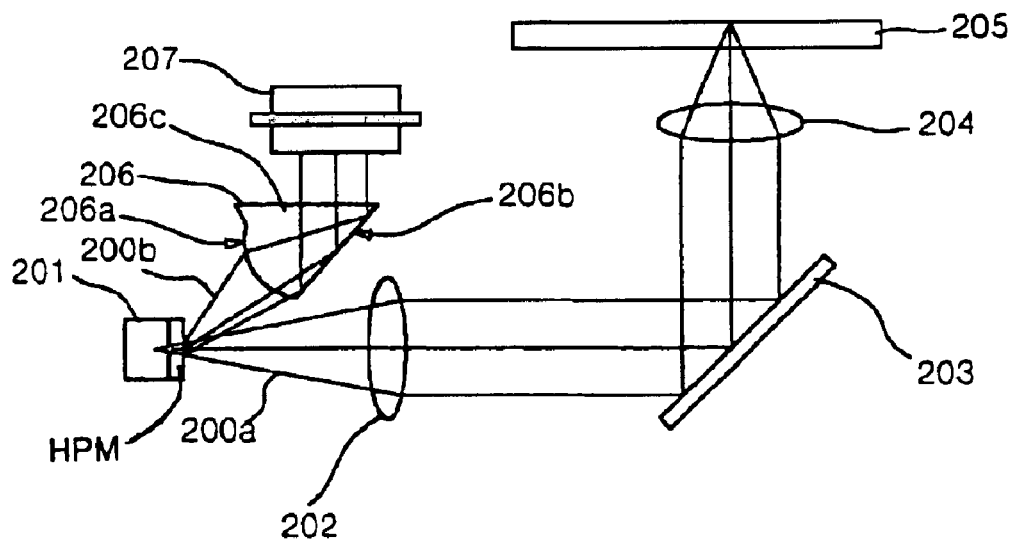
FIG. 2 is a view illustrating the configuration of an optical device using a lens for light collection for total reflection for a monitor PD according to a first embodiment of the present invention.

FIG. 2 is a view illustrating the configuration of an optical device using a lens for light collection for total reflection for a monitor PD according to a first embodiment of the present invention.

Referring to FIG. 2, the optical device includes a light source 201, a collimator lens 202, a mirror 203, an objective lens 204, an optical disc 205, a lens for light collection 206, and a monitor PD 207.

An HPM is arranged at a front end of the light source 201 in order to diffract a light beam emitted from the light source 201. The collimated lens 202 converts a zero-order diffracted beam 200a, outputted from the HPM, into a collimated beam. The mirror 203 reflects the collimated beam so as to make the collimated beam incident to the objective lens 204. The collimated beam incident to the objective lens 204 is focused in the form of an optical spot onto the optical disc 205 by the objective lens 204. Thus, data is written on the optical disc 205 or read from the optical disc 205.

Meanwhile, the lens for light collection 206 converges a first-order diffracted beam 200b outputted from the HPM, and applies the converged first-order diffracted beam 200b to the monitor PD 207.

In particular, the lens for light collection 206 is provided with a lens face 206a, a reflective face 206b, and an exit face 206c. This lens for light collection 206 may be formed to have an integral structure using an injection molding process.

The first-order diffracted beam 200b emitted from the light source 201 is incident to the lens face 206a which, in turn, converges the incident beam. To this end, it is preferred that the lens for light collection 206 have a spherical face convex toward the light source 201.

The reflective face 206b totally reflects the first-order diffracted beam 200b passing through the lens face 206a. The reflective face 206b can completely reflect the first-order diffracted beam 200b even when it has no coating.

The exit face 206c transmits the reflected first-order diffracted beam to the monitor PD 207. The monitor PD 207 may be arranged to face the exit face 206c.

In order to allow the lens for light collection 206 to converge the first-order diffracted beam 200b incident thereto, the lens face 206a has a convex shape. Where the lens for light collection 206 is formed using an injection molding process, it is necessary to take into consideration respective shapes of the reflective face 206b and exit face 206c in order to allow the first-order diffracted beam 200b to be totally reflected toward the monitor PD 207 after passing through the lens face 206a. In this case, it is preferred that the facing edges of the reflective face 206b and exit face 206c be in contact with each other while forming a desired angle therebetween. Alternatively, the lens for light collection 206 may be fabricated by coupling a triangular prism with a lens having a convex face at one surface thereof.

Here, it is to be noted that no coating is formed on either the reflective face 206b or the exit face 206c.

The HPM used in the first embodiment of the present invention has an HOE having a left diffraction angle of 15.58° and a right diffraction angle of 19.36° while exhibiting a diffraction efficiency of 87.4% for a zero-order diffraction and a diffraction efficiency of 4.9% for a first-order diffraction. In order to minimize an interference with the main part of the optical system, which utilizes a main beam, namely, the zero-order diffracted beam, in particular, the collimator lens, the HOE utilizes a first-order diffracted beam having a diffracted angle of 19.36°. The HOE also has a laser radiation angle of 7°×16° at most and 11°×21° at least. Typically, the HOE has a laser radiation angle of 8°×18.5°.

In accordance with the first embodiment of the present invention, the zero-order diffracted beam (main beam) 200a outputted from the HPM is converted into a collimated beam by the collimator lens 202, as shown in FIG. 2. Thereafter, the collimated beam is reflected by the mirror 203, and then focused onto a specific spot on the optical disc 205 through the objective lens 204.

On the other hand, the first-order diffracted beam 200b outputted from the HPM is applied to the monitor PD 207 by the lens for light collection 206. That is, the first-order diffracted beam 200b from the HPM is converged by the lens face 206a, totally reflected by the reflective face 206b, and then applied to the monitor PD 207 after passing through the exit face 206c.

Figure 3:
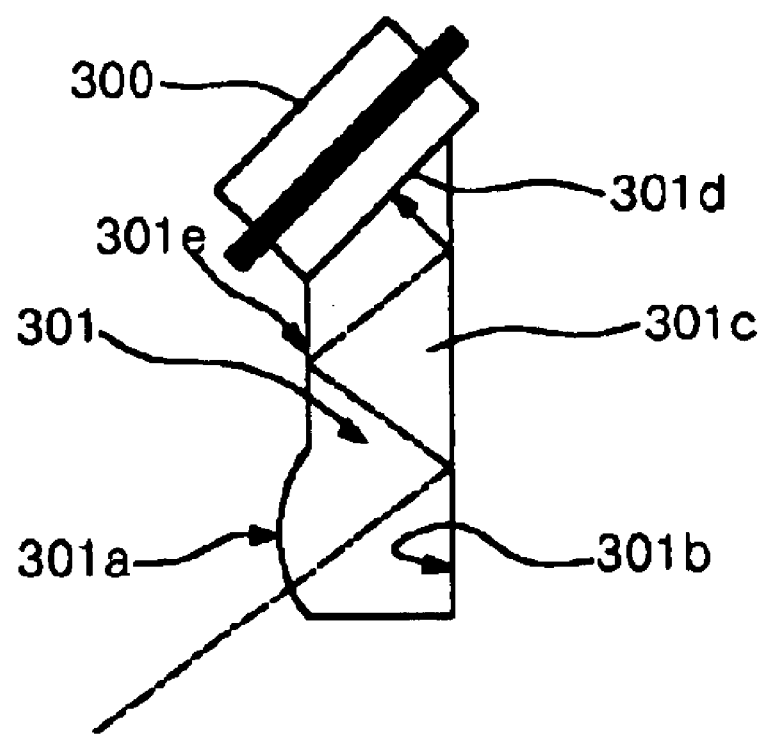
FIG. 3 is a view illustrating the structure of a lens for light collection for total reflection according to a second embodiment of the present invention.

FIG. 3 is a view illustrating the structure of a lens for light collection for total reflection according to a second embodiment of the present invention.

Referring to FIG. 3, the lens for light collection, which is denoted by the reference numeral 301, is provided at one side surface thereof with a spherical lens face 206a, which is outwardly convex. The lens for light collection 301 is also provided at both side surfaces thereof with a first reflective face 301b and a second reflective face 301e, respectively, and the first and second reflective faces 301b and 301e extend in parallel. An optical waveguide 301c is formed between the first and second reflective faces 301b and 301e in order to guide the first-order diffracted beam to a monitor PD 300. The lens for light collection 301 also has an inclined exit face 301d arranged at a downstream end of the optical waveguide 301c. The monitor PD 300 is attached to the exit face 301d in a face-to-face fashion.

In accordance with the second embodiment of the present invention, the first-order diffracted beam outputted from the light source is incident to the lens face 301a which, in turn, converges the first-order diffracted beam. The converged first-order diffracted beam is totally reflected by the first reflective face 301b, and then totally reflected again by the second reflective face 301e. The first-order diffracted beam advances toward the exit face 301b while being repeatedly subjected to the total reflection alternately conducted by the first and second reflective faces 301b and 301e. Finally, the first-order diffracted beam is incident to the monitor PD 300 through the exit face 301d.

Since the lens for light collection 301 has the optical waveguide 301c adapted to guide the first-order diffracted beam from the lens face 301a to the monitor PD 300, it can securely guide the first-order diffracted beam without any light loss even when the monitor PD 300 is arranged at a position spaced apart from the light source by a more or less considerable distance.

In accordance with the optical system, to which the lens for light collection of FIG. 2 or 3 according to the present invention is applied, the amount of exit light emerging from the objective lens is increased, as compared to the conventional case in which the main beam, namely, the zero-order diffracted beam, is partially utilized. This is because the first-order diffracted beam is utilized as a light beam for the monitor PD, in accordance with the present invention.

As the amount of exit light emerging from the objective lens increases, the amount of light incident to the monitor PD becomes linear. Accordingly, there is no problem in controlling recording optical power.

Since the focusing has an increased laser radiation angle, an increased optical efficiency is obtained. In addition, it is possible to prevent the light beam, reflected by the reflective face of the lens for light collection, from being fed back to the HOE, thereby interfering with the light beam outputted from the HOE, because the reflective face has an appropriate angle. Accordingly, the lens for light collection of the present invention naturally solves problems associated with the stability of operations.

Thus, the optical pick-up device using the lens for light collection for total reflection according to the present invention can achieve an enhancement in the efficiency of utilizing a main beam, namely, a zero-order diffracted beam, an improvement in optical characteristics, and an improvement in the axial distance between the light source and the monitor PD.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. An optical pick-up device comprising:
    a light source provided with a holographic unit adapted to diffract a light beam;
    an optical disc adapted to allow data to be written thereof or to be read therefrom;
    a monitor photodiode served to monitor a laser power of the light source; and
    a lens for light collection arranged between the light source and the monitor photodiode and adapted to converge a first-order diffracted beam outputted from the holographic unit and to apply the converged first-order diffracted beam to the monitor photodiode, including:
    a lens face for converging the first-order diffracted light beam;
    a total reflective face for totally reflecting the converged first-order diffracted beam; and
    an exit face for transmitting the reflected first-order diffracted beam to the monitor photodiode,
    wherein the lens face has a spherical shape convex toward the light source.

2. An optical pick-up device comprising:
    a light source provided with a holographic unit adapted to diffract a light beam;
    an optical disc adapted to allow data to be written thereof or to be read therefrom;
    a monitor photodiode served to monitor a laser power of the light source; and
    a lens for light collection arranged between the light source and the monitor photodiode and adapted to converge a first-order diffracted beam outputted from the holographic unit and to apply the converged first-order diffracted beam to the monitor photodiode, including:
    a lens face for converging the first-order diffracted light beam;
    a total reflective face for totally reflecting the converged first-order diffracted beam; and
    an exit face for transmitting the reflected first-order diffracted beam to the monitor photodiode,
    wherein facing edges of the reflective face and the exit face are in contact with each other.

3. An optical pick-up device comprising:
    a light source provided with a holographic unit adapted to diffract a light beam;
    an optical disc adapted to allow data to be written thereof or to be read therefrom;
    a monitor photodiode served to monitor a laser power of the light source; and
    a lens for light collection arranged between the light source and the monitor photodiode and adapted to converge a first-order diffracted beam outputted from the holographic unit and to apply the converged first-order diffracted beam to the monitor photodiode, including:
    a lens face for converging the first-order diffracted light beam;
    a first reflective face for totally reflecting the converged first-order diffracted beam passing through the lens face;
    a second reflective face for totally reflecting again the reflected first-order diffracted beam; and
    an exit face for transmitting the first-order diffracted beam, repeatedly reflected, to the monitor photodiode.

4. The optical pick-up device according to claim 3, wherein the first and second reflective faces are parallel with each other so that the first-order diffracted beam is repeatedly totally reflected.

5. The optical pick-up device according to claim 3, wherein the lens for light collection further comprises an optical waveguide arranged between the first and second reflective faces to guide the first-order diffracted beam to the monitor photodiode.

6. The optical pick-up device according to claim 3, wherein the exit face has an inclined shape with respect to the first-order diffracted beam traveling along the optical waveguide.

7. The optical pick-up device according to claim 3, wherein the monitor photodiode is coupled to the exit face while facing the exit face.

* * * * *